United States Patent
Yu et al.

(10) Patent No.: US 11,916,641 B2
(45) Date of Patent: Feb. 27, 2024

(54) METHOD OF SYNCHRONIZING THE H AND V PHASE IN A DUAL-POLARIZED PHASED ARRAY SYSTEM

(71) Applicant: SAMSUNG ELECTRONICS CO., LTD., Suwon-si (KR)

(72) Inventors: Xiaohua Yu, San Jose, CA (US); Wei-Hsuan Sharon Kung, Mountain View, CA (US); Siu-Chuang Ivan Lu, San Jose, CA (US); Sangwon Son, Palo Alto, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/695,460

(22) Filed: Mar. 15, 2022

(65) Prior Publication Data

US 2022/0337307 A1    Oct. 20, 2022

Related U.S. Application Data

(60) Provisional application No. 63/175,053, filed on Apr. 14, 2021.

(51) Int. Cl.
*H04B 7/10* (2017.01)
*H04B 1/38* (2015.01)
(Continued)

(52) U.S. Cl.
CPC ............... *H04B 7/10* (2013.01); *H04B 1/38* (2013.01); *H04B 1/50* (2013.01); *H04B 17/101* (2015.01)

(58) Field of Classification Search
CPC .... H04B 1/0039; H04B 1/005; H04B 1/0064; H04B 1/38; H04B 1/40; H04B 1/44;
(Continued)

(56) References Cited

U.S. PATENT DOCUMENTS 7,492,841 B2    2/2009 Fisher et al.
8,228,232 B2    7/2012 Corman et al.
(Continued)

FOREIGN PATENT DOCUMENTS

CN    108206705 A  *  6/2018  ............... H01Q 1/22

*Primary Examiner* — Young T. Tse
(74) *Attorney, Agent, or Firm* — Sughrue Mion, PLLC

(57) ABSTRACT

A communication device, including a plurality of transceiver modules; a storage configured to store calibration information; and at least one processor configured to: generate a first dual-polarized RF signal by controlling a first transceiver module to generate a first RF signal based on the calibration information; measure, by a second transceiver module, a first signal power of the first dual-polarized RF signal; adjust a parameter of the first transceiver module, and generate a second dual-polarized RF signal by controlling the first transceiver module to generate a second RF signal based on the adjusted parameter; measure, by the second transceiver module, a second signal power of the second dual-polarized RF signal; and generate an aligned dual-polarized RF signal by controlling the plurality of transceiver modules to generate a plurality of RF signals based on a result of a comparison between the first signal power and the second signal power.

30 Claims, 9 Drawing Sheets

(51) Int. Cl.
  *H04B 1/50* (2006.01)
  *H04B 17/10* (2015.01)
(58) Field of Classification Search
  CPC ... H04B 1/50; H04B 7/02; H04B 7/04; H04B 7/0413; H04B 7/10; H04B 17/101; H04B 17/201; H04B 17/202; H04B 17/309
  USPC .......... 375/141, 219, 220, 260, 267; 455/39, 455/500, 503, 67.11, 73, 78, 88
  See application file for complete search history.

(56) References Cited

U.S. PATENT DOCUMENTS

| | | | |
|---|---|---|---|
| 10,680,725 | B1 | 6/2020 | Lu et al. |
| 11,528,076 | B1* | 12/2022 | Bily .................. H04B 7/18513 |
| 2008/0132192 | A1 | 6/2008 | Lim |
| 2013/0034196 | A1* | 2/2013 | Vann ....................... H04B 7/002 |
| | | | 375/350 |
| 2020/0144733 | A1* | 5/2020 | Chakraborty .......... H01Q 1/243 |
| 2021/0013940 | A1* | 1/2021 | Lu ........................ H04B 7/0686 |
| 2021/0297141 | A1* | 9/2021 | Schafer .................... H01Q 3/30 |
| 2022/0224022 | A1* | 7/2022 | Liu ........................... H04B 1/18 |

* cited by examiner

| | Gain | Phase (Case 1) | Phase (Case 2) |
|---|---|---|---|
| $Sig_H$ | $g_1 + x_1$ | $\phi_0 + \phi_1$ | $\phi_0 + \phi_1 + 180$ |
| $Sig_V$ | $g_2 + x_2$ | $\phi_2$ | $\phi_2$ |
| Set: $g_1+x_1=g_2+x_2=G$ ⇒ $\phi_0 + \phi_1 = \phi_2$ | | $\lvert Sig_H \rvert + \lvert Sig_V \rvert$ | $\lvert Sig_H \rvert - \lvert Sig_V \rvert$ |

FIG. 4

METHOD OF SYNCHRONIZING THE H AND V PHASE IN A DUAL-POLARIZED PHASED ARRAY SYSTEM

CROSS-REFERENCE TO RELATED APPLICATION

This application claims priority from U.S. Provisional Patent Application No. 63/175,053, filed on Apr. 14, 2021, in the U.S. Patent and Trademark Office, which is incorporated by reference herein in its entirety.

BACKGROUND

1. Field

Apparatuses and methods consistent with embodiments relate to communication systems, and more particularly to, synchronizing phases in a dual-polarized phased array system.

2. Description of Related Art

Currently, a 5th Generation (5G) mmWave solution operating according to Frequency Range 2 (FR2) may use a dual-polarized phased antenna array, which may be, for example, polarized in a Horizontal (H) direction and a Vertical (V) direction. Accordingly, H-polarized transceiver modules and V-polarized transceiver modules may transmit or receive at the same time. When in a transmitting mode, the transmitted H-polarized power and V-polarized power may be combined in the air, and it may be a requirement for a communication system 100 that a total combined power, including the H-polarized power and the V-polarized power, must be stable.

In order to achieve a stable power, it may be necessary for the transmitted power to be stable for each polarization, and also for the relative phase of H and V to be constant.

SUMMARY

According to embodiments, a communication device includes a plurality of transceiver modules including a first transceiver module and a second transceiver module; a storage configured to store calibration information; and at least one processor configured to: generate a first dual-polarized RF signal by controlling the first transceiver module to generate a first RF signal based on the calibration information; measure, by the second transceiver module, a first signal power of the first dual-polarized RF signal; adjust a parameter of the first transceiver module, and generate a second dual-polarized RF signal by controlling the first transceiver module to generate a second RF signal based on the adjusted parameter; measure, by the second transceiver module, a second signal power of the second dual-polarized RF signal; and generate an aligned dual-polarized RF signal by controlling the plurality of transceiver modules to generate a plurality of RF signals based on a result of a comparison between the first signal power and the second signal power.

According to embodiments, a communication device includes a plurality of transceiver modules including a first transceiver module, a second transceiver module, and a third transceiver module; a storage configured to store calibration information; and at least one processor configured to: measure, using the second transceiver module, a plurality of differences between a plurality of pairs of dual-polarized RF signals, wherein each pair of the plurality of pairs of dual-polarized RF signals includes a dual-polarized RF signal generated using the first transceiver module and the third transceiver module, and an offset dual-polarized RF signal generated using the first transceiver module and the third transceiver module; determine a calibration first phase setting corresponding to the first transceiver module based on the plurality of differences; and determine the calibration information based on the calibration first phase setting.

According to embodiments, a method of controlling a communication device is executed by at least one processor and includes obtaining calibration information; generating a first dual-polarized RF signal by controlling a first transceiver module of a plurality of transceiver modules to generate a first RF signal based on the calibration information; measuring, by a second transceiver module of the plurality of transceiver modules, a first signal power of the first dual-polarized RF signal; adjusting a parameter of the first transceiver module, and generating a second dual-polarized RF signal by controlling the first transceiver module to generate a second RF signal based on the adjusted parameter; measuring, by the second transceiver module, a second signal power of the second dual-polarized RF signal; and generating an aligned dual-polarized RF signal by controlling the plurality of transceiver modules to generate a plurality of RF signals based on a result of a comparison between the first signal power and the second signal power.

According to embodiments, a method of controlling a communication device is executed by at least one processor and includes measuring, using a second transceiver module of a plurality of transceiver modules, a plurality of differences between a plurality of pairs of dual-polarized RF signals, wherein each pair of the plurality of pairs of dual-polarized RF signals includes a dual-polarized RF signal generated using a first transceiver module and a third transceiver module, and an offset dual-polarized RF signal generated using the first transceiver module and the third transceiver module; determining a calibration first phase setting corresponding to the first transceiver module based on the plurality of differences; and determining the calibration information based on the calibration first phase setting.

BRIEF DESCRIPTION OF THE DRAWINGS

FIG. 4 is an explanatory chart illustrating a relationship between phase and signal power, according to embodiments

DETAILED DESCRIPTION

Various embodiments will be described below with reference to the drawings. It is understood that the embodiments described herein are example embodiments, and thus, the embodiments are not limited thereto and may be realized in other forms.

In embodiments, the term "phased array" may refer to at least two antennas that collectively communicate (i.e., transmit and/or receive) one or more information signals. In a phased array, an insertion phase of signal paths connected to the antennas is set or dynamically adjusted to generate a beam that points in a desired direction. The term "phased array" as used herein may also refer collectively to at least two sets of antennas disposed within the same antenna module, where each antenna set includes plural antenna elements. In this case, a first antenna set of the phased array may be used to communicate signal energy polarized in a first direction and a second antenna set may be used to communicate signal energy polarized in a second direction.

In embodiments, the terms "antenna element" and "antenna" may be used interchangeably. A wireless communication device may also be referred to as a communication device.

In embodiments, when an antenna is said to communicate a signal, the antenna may transmit and/or receive the signal.

In embodiments, the term radio frequency (RF) may be used to encompass frequencies ranging from kHz frequencies to mmWave frequencies.

In embodiments, the words "transmit" and "receive" may be used as adjectives. For instance, "a receive signal" refers to a signal being received, "a transmit signal" refers to a signal being transmitted, "receive signal power" refers to power of a receive signal, etc.

Figure 1:
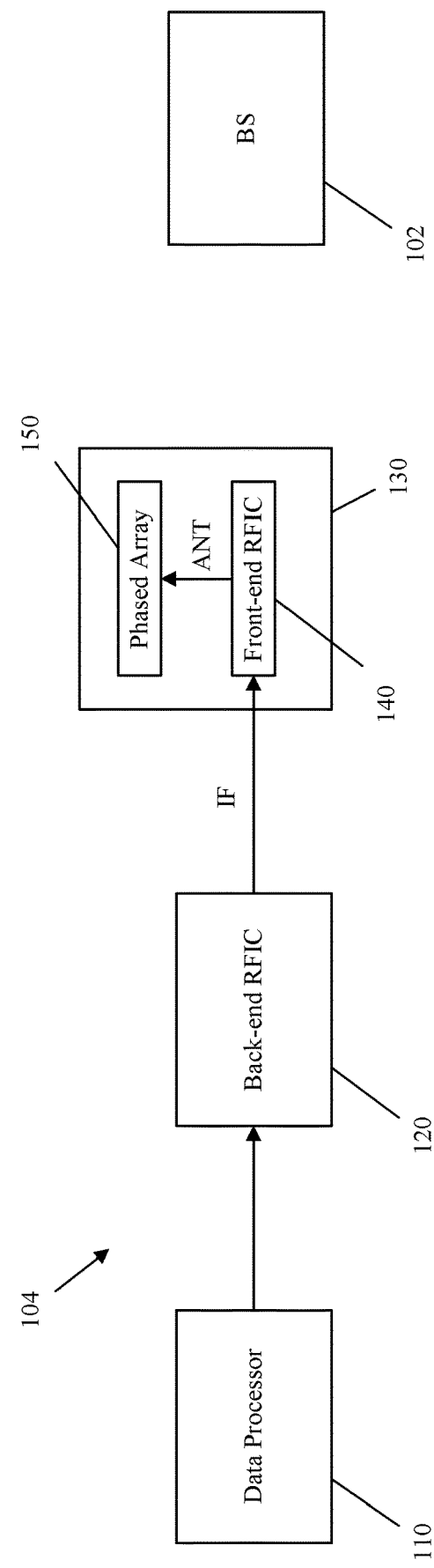
FIG. 1 is a block diagram of wireless communication system, according to embodiments.

FIG. 1 is a block diagram of a wireless communication system 100, including a communication device, according to an embodiment. The wireless communication system 100 may include a wireless communication system using a cellular network, such as a 5th generation wireless (5G) system, a long term evolution (LTE) system, an LTE-advanced system, a code division multiple access (CDMA) system, a global system for mobile communication (GSM) system, a wireless local area network (WLAN) system, or another type of wireless communication system. Hereinafter, the wireless communication system 100 will be described mainly as a wireless communication system using a cellular network, but embodiments involving non-cellular networks are also possible. As shown in FIG. 1, in the wireless communication system 100, wireless communication devices, i.e., a base station (BS) 102 and user equipment (UE) 104, may communicate with each other.

The BS 102 may refer to a fixed station communicating with a UE and/or another BS, and may exchange data and control information by communicating with the UE and/or the other BS. For example, the BS 102 may be a Node B, an evolved-Node B (eNB), a sector, a site, a base transceiver system (BTS), an access point (AP), a relay node, a remote radio head (RRH), a radio unit (RU), or a small cell. In the present disclosure, a "cell" has a comprehensive meaning that indicates a partial region or function, e.g., covered by a base station controller (BSC) in CDMA, a Node B in WCDMA, an eNB or sector (site) in LTE. Examples of a cell's range include various coverage regions such as mega-cell, macro-cell, micro-cell, pico-cell, femto-cell, relay node, RRH, RU, and small cell communication ranges.

The UE 104 may be fixed or mobile, and may include any device capable of transmitting or receiving data and/or control information by communicating with the BS 102. For example, the UE 104 may be terminal equipment, a mobile station (MS), a mobile terminal (MT), a user terminal (UT), a subscriber station (SS), a wireless device, or a handheld device.

A wireless communication network between the UE 104 and the BS 102 may support communication between users by sharing available network resources. For example, in the wireless communication network, information may be transferred via various multiple access methods, such as CDMA, frequency division multiple access (FDMA), time division multiple access (TDMA), orthogonal frequency division multiple access (OFDMA), single carrier frequency division multiple access (SC-FDMA), OFDM-FDMA, OFDM-TDMA, and OFDM-CDMA. As shown in FIG. 1, the UE 104 and the BS 102 may communicate with each other through an uplink UL and a downlink DL. According to some embodiments, user devices may communicate with each other through a sidelink as in device-to-device (D2D) communication.

As shown in FIG. 1, the UE 104 may include an antenna module 130, a back-end radio frequency integrated circuit (RFIC) 120, and a data processor 110. The antenna module 130 may communicate with the back-end RFIC 120, and the back-end RFIC 120 may communicate with the data processor 110. In FIG. 1, the UE 104 includes one antenna module 130, but in embodiments the UE 104 may include more or fewer antenna modules, as desired.

The antenna module 130 may include a phased array. For example, the antenna module 130 may include a phased array 150 including of a plurality of antennas. The plurality of antennas of the phased array 150 may be used to collectively form a beam according to some embodiments, and may be used for a multiple-input multiple-output (MIMO) based communication scheme. For instance, using MIMO, the antenna module 130 may together be used to concurrently communicate a plurality of independent signals occupying a same frequency band, but propagating in different directions, thereby increasing a throughput. Also, according to some embodiments, the phased array 150 may include an antenna configured to communicate a signal polarized in a pre-determined direction, or may include an antenna configured to simultaneously transmit or receive at least two signals polarized in different directions.

The antenna module 130 may include a front-end RFIC. For example, the antenna module 130 may include a front-end RFIC 140 which may be coupled to a plurality of antennas of the phased array 150. The front-end RFIC 140 may provide, to the back-end RFIC 120, a signal generated by processing signals received from the phased array 150 in a reception mode, or provide, to the phased array 150, a signal generated by processing a signal received from the back-end RFIC 120 in a transmission mode.

The back-end RFIC 120 may process or generate a baseband signal. For example, the back-end RFIC 120 may receive a baseband signal from the data processor 110 and provide a signal generated by processing the baseband signal to at least one of the antenna module 130. Further, the back-end RFIC 120 may provide a baseband signal generated by processing a signal received from at least one of the antenna module 130 to the data processor 110.

The data processor 110 may generate a baseband signal based on data to be transmitted to the BS 102 and provide the baseband signal to the back-end RFIC 120, or may extract data received from the BS 102 from a baseband signal received from the back-end RFIC 120. For example, the data processor 110 may include at least one digital-to-analog converter (DAC) that outputs a baseband signal by converting digital data modulated from data to be transmitted to the BS 102. The data processor 110 may also include at least one analog-to-digital converter (ADC), wherein the at least one ADC may output digital data by converting a baseband signal. According to some embodiments, the data processor 110 may include at least one core executing a series of instructions and may be referred to as a modem.

Some of a plurality of signals corresponding to the phased arrays of the antenna module 130 may be used for communication with the BS 102.

In the description below, the UE 104 will be used as an example of a communication device, but embodiments are not limited thereto, and may be applied for example to different types of communication devices, such as another BS similar to the BS 102.

In embodiments, the UE 104 configured according to 5G Frequency Range (FR2) may include the phased array 150 which is configured as a dual-polarized antenna array. In embodiments, the dual-polarized antenna array may transmit and receive signals which are polarized in two different directions, for example a horizontal direction H and a vertical direction V.

Figure 2:
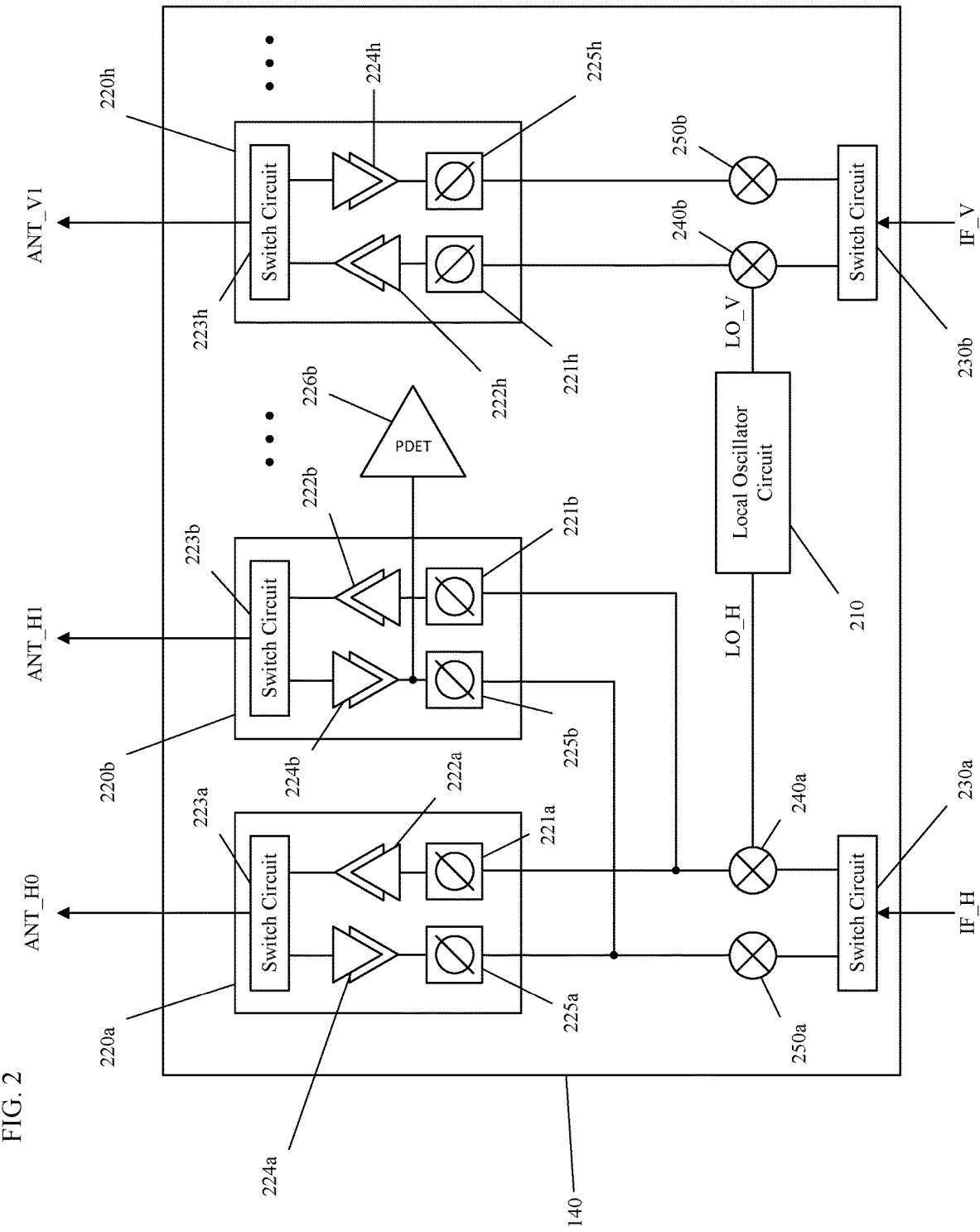
FIG. 2 is a block diagram of a transceiver module, according to embodiments.

FIG. 2 illustrates an example of a front-end RFIC 140 configured to operate with such a dual-polarized antenna array. As can be seen in FIG. 2, the front-end RFIC 140 may include a local oscillator (LO) circuit 210 and a plurality of transceiver modules 220, i.e., 220*a* to 220*h*. In embodiments, the dual-polarized antenna array may be configured to transmit and receive signals corresponding to a plurality of directions, and may include one H-polarized antenna and one V-polarized antenna for each direction.

For example, in embodiments the dual-polarized antenna array may include antennas corresponding to four directions, for example direction θ, direction 1, direction 2, and direction 3. As a result, the dual-polarized antenna array may include two antennas for each direction, for a total of eight (8) antennas, which may be designated H0, H1, H2, H3, V0, V1, V2 and V3. Accordingly, front-end RFIC 140 may include eight (8) transceiver modules 220, which may be designated transceiver modules 220*a*-220*h*. In embodiments, as shown in FIG. 2, transceiver module 220*a* may correspond to antenna H0, and may communicate with antenna H0 using signal ANT_H0. In embodiments, transceiver module 220*b* may correspond to antenna H1, and may communicate with antenna H1 using signal ANT_H1. In embodiments, transceiver module 220*h* may correspond to antenna V1, and may communicate with antenna V1 using signal ANT_V1.

Embodiments are described below with respect to transceiver module 220*a*. Because each of transceiver modules 220*a*-220*h* may have corresponding components, redundant description of transceiver modules 220*b*-220*h* is omitted for convenience of description.

In embodiments, the transceiver module 220*a* may be configured to operate in one of a transmit mode and a receive mode. In embodiments, when the transceiver module 220*a* operates in the transmit mode, the front-end IC 140 may receive intermediate frequency (IF) signals from back-end RFIC 120 through switch circuit 230*a*. The switch circuit 230*a* may provide the IF signals to mixer 240*a*, which may upconvert the IF signals into RF signals which may be appropriate for the transceiver module 220*a* based on local oscillator signals LO. In embodiments, the switch circuit 230*a* may provide the signal IF_H to the mixer 240*a*, which may upconvert the signal IF_H using signal LO_H and provide the upconverted signal to the H-polarized transceiver modules 220*a*-220*d*. Similarly, switch circuit 230*b* may provide signal IF_V to mixer 240*b*, which may upconvert the signal IF_V using signal LO_V and provide the upconverted signal to the V-polarized transceiver modules 220*e*-220*h*.

In embodiments, the upconverted signal may be provided to first phase shifter 221*a*, which may add a phase shift to the upconverted signal before providing the shifted upconverted signal to power amplifier 222*a*. The signal may be amplified by power amplifier 222*a* and provided to antenna H0 as signal ANT_H0 using switch circuit 223*a*. In embodiments, the first phase shifter 221*a* may add the phase shift based on a phase code, which may correspond to a particular amount of phase shift. For example, in embodiments 360 degrees may be divided into 16 increments represented by 16 phase codes. Accordingly, adding 8 to a phase code of a signal may correspond to phase shifting the signal by 180 degrees. As an example, a signal corresponding to phase code 8 may be shifted by 180 degrees with respect to a signal corresponding to phase code 0, a signal corresponding to phase code 9 may be shifted by 180 degrees with respect to a signal corresponding to phase code 1, and so on.

In embodiments, when the transceiver module 220*a* operates in the receive mode the front-end IC circuit may receive RF signals from antenna H0 through the switch circuit 223*a*. The switch circuit 223*a* may provide the RF signals to low-noise amplifier (LNA) 224*a*, which may provide the amplified RF signals to second phase shifter 225*a*, which may add a phase shift to the amplified RF signals before providing the phase shifted amplified RF signals to mixer 250*a* to be downconverted and provided to back-end RFIC 120 using switch circuit 230*a*.

In embodiments, the transceiver modules 220 may include a power detector (PDET) 226. Although only PDET 226*b* corresponding to transceiver module 220*b* is illustrated in FIG. 2, in embodiments each of transceiver modules 220*a*-220*h* may include corresponding PDETs. In embodiments, the PDET 226*b* may measure a signal power of a signal ANT_H1, which may be an RF signal received using antenna H1.

In embodiments, a transceiver module 220 operating in a transmit mode may be referred to using an abbreviation TX, and a transceiver module operating in a receive mode may be referred to using an abbreviation RX. For example, in embodiments TXH0 may refer to transceiver module 220*a* configured to operate in a transmit mode, RXH1 may refer to a transceiver module 220*b* operating in a receive mode, and a TXV1 may refer to transceiver module 220*h* operating in a transmit mode, however embodiments are not limited thereto. In embodiments, TXH0 may be referred to as a first transceiver module, RXH1 may be referred to as a second transceiver module, and TXV1 may be referred to as a third transceiver module, but embodiments are not limited thereto.

Although the description above relates to a dual-polarized phased array having 8 antennas, embodiments are not limited thereto, and any number of antennas may be used as desired.

In the UE 104 including a dual-polarized phased array 150 as described above, the H-polarized transceiver modules, for example transceiver modules 220*a*-220*d*, and the V-polarized transceiver modules, for example transceiver modules 220*e*-220*h*, may transmit or receive at the same time. When in transmitting mode, the transmitted H-polarized power and V-polarized power may be combined in the air, and it may be a requirement of communication system 100 that a total combined power, including the H-polarized power and the V-polarized power, must be stable.

As described above, in order to achieve a stable power, it may be necessary for the transmitted power to be stable for each polarization, and also for the relative phase of H and V to be constant.

As described above, in the UE 104, there may be an IF-RF frequency conversion. For example, as shown in FIG. 2, the IF signals from the back-end RFIC 120, for example the signal IF_H corresponding to the H-polarized transceiver modules 220a-220d and the signal IF_V corresponding to the V-polarized transceiver modules 220e-220h, may be converted to RF signals, for example the H-polarized RF signals ANT_H0-ANT_H3, and the V-polarized RF signals ANT_V0-ANT_V3, using the front-end RFIC 140. In embodiments, the phase of the transmitted signal may be impacted by the phase delay in both the signal path corresponding to each of these signals, and also the LO path corresponding to LO circuit 210.

In the front-end RFIC 140 illustrated in FIG. 2, RF phase shifting is used. In embodiments, the phase delay in the signal path may be pre-determined for a given phase setting, the phase of the LO signals, for example the signal LO_H and the signal LO_V, may or may not be pre-determined depending on how it was generated.

Figure 3:
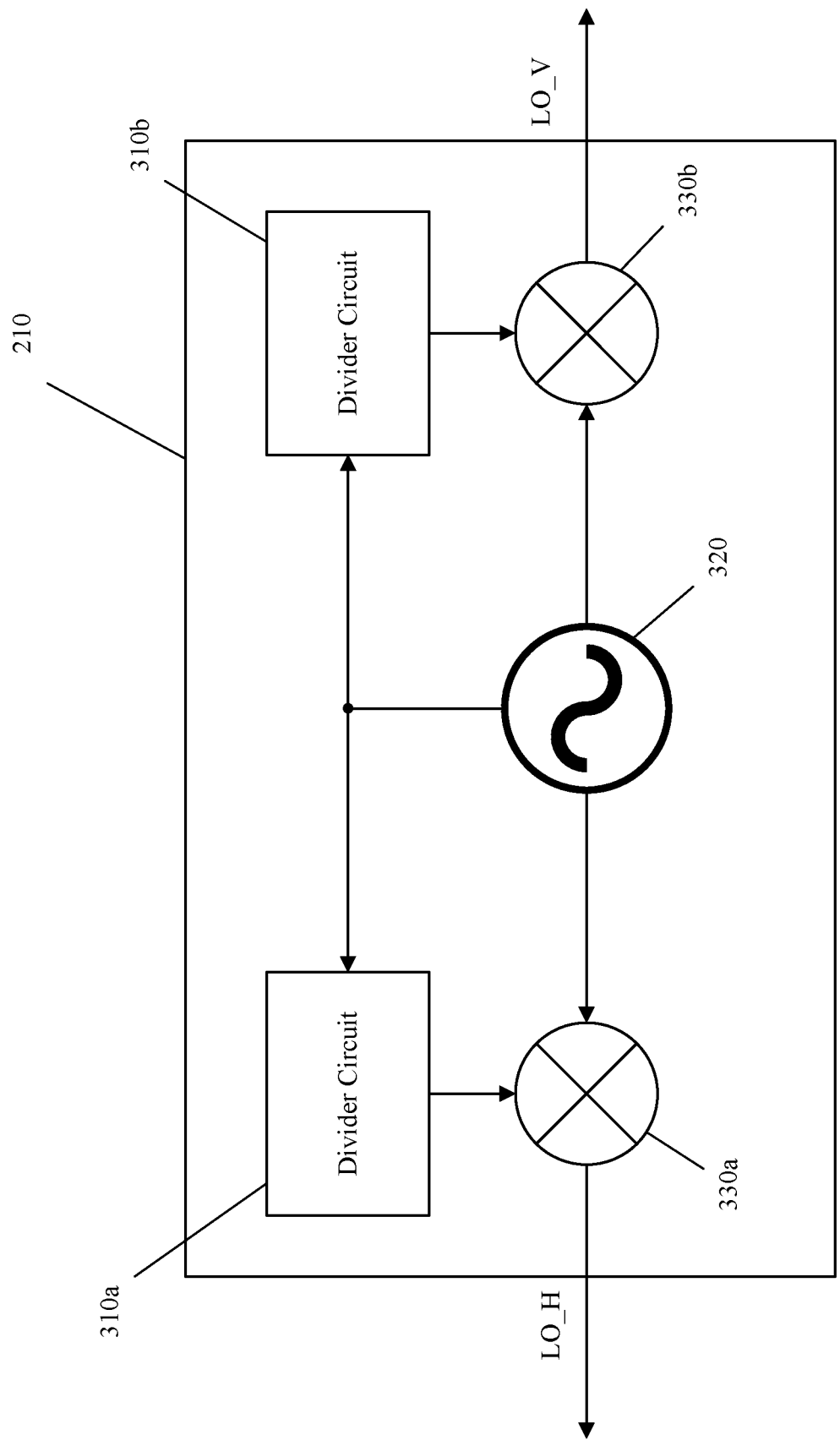
FIG. 3 is a block diagram of a local oscillator circuit, according to embodiments.

For example, as shown in FIG. 3, the signal LO_H and LO_V may be generated using two separate divider circuits, for example divider circuit 310a and divider circuit 310b, which may be divide-by-two circuits which may be configured to receive an input signal having a given frequency and generate an output signal having a frequency which is half of the frequency of the input signal.

As shown in FIG. 3, the signal LO_H and the signal LO_V may be obtained by providing by mixing the VCO signal and its divide-by-two signal using mixer 330a and mixer 330b. For example, in embodiments the IF signals may be in the 9 GHz range, and the transceiver modules 220a-220h may be configured to operate in the 39G band (for example 37 GHz-40 GHz). Accordingly, the LO circuit 210 may be provided with a VCO having a 20 GHz frequency, and the LO circuit 210 may use the divider circuits 310a and 310b and the mixers 330a and 330b to provide signals LO_H and LO_V having a 30 GHz frequency which may be used to upconvert the 9 GHz IF signals to frequencies appropriate for a 39G band. However, embodiments are not limited thereto, and in embodiments the transceiver modules 220a-220h may be configured to operate in any band as desired, for example the 28G band (for example 24 GHz-30 GHz), and or any other band.

In embodiments, each of the divider circuit 310a and the divider circuit 310b can be triggered by the rising edge and falling edge of the VCO signal. Therefore, for a given phase of the VCO signal, there may be two states for the phase of the LO signal: aligned with the rising edge of the VCO signal or the falling edge of the VCO signal. As a result, every time that the LO circuit 210 is disabled and re-enabled, the phase of one or both of the signal LO_H and the signal LO_V may flip 180 degrees. Thus, the phase of the transmitted H-polarized signal or V-polarized signal could be in phase or out-of-phase by 180 degrees, resulting in two possible states of the combined H+V signal power. As a result, the combined power may fluctuate.

FIG. 4 shows an example of such a fluctuation. FIG. 4 shows an example of a combined H+V signal power in a first case, in which two signals are in phase, and a second case, in which two signals are out of phase. In FIG. 4, $Sig_H$ refers to an H-polarized RF signal, which may correspond to a signal transmitted using TXH0 and received using RXH1, and $Sig_V$ refers to a V-polarized RF signal, which may correspond to a signal transmitted using TXV1 and received using RXH1. As shown in FIG. 4, $g_1$ is a gain corresponding to TXH0, $x_1$ is a gain caused by coupling in the antenna path between antenna H0 and antenna H1 for the signal transmitted from TXH0 to RXH1, $\phi_1$ is a phase delay along the antenna path between antenna H0 and antenna H1, and $\phi_0$ is a phase shift provided by the phase shifter corresponding to TXH0, for example first phase shifter 221a. Similarly, $g_2$ is a gain corresponding to TXV1, $x_2$ is a gain caused by coupling in the antenna path between antenna V1 and antenna H1 for the signal transmitted from TXV1 to RXH1, and $\phi_2$ is a phase delay along the antenna path between antenna H0 and antenna H1.

As can be seen in FIG. 4, when the gains and the phase delays are adjusted to be equal, a large difference in total signal power can be seen between a signal power corresponding to case 1, which may be represented as $|Sig_H|+|Sig_V|$, and a signal power corresponding to case to, which may be represented as $|Sig_H|-|Sig_V|$. For example, in case 2 the signal power is greatly reduced due to cancellation.

In embodiments, the relative H/V phase may be maintained by keeping the LO circuit 210 in an always-on state. However, this may cause undesirable power consumption. In addition, this may not be feasible when the UE 104 switches modes, for example by switching the front-end RFIC 140 between modes such as a 39G mode and a 28G mode.

In embodiments, the two-state issue described above may be avoided if UE 104 is re-designed, for example by redesigning the front-end RFIC 140. For example, using a single LO generation block for both LO_H and LO_V would guarantee that the phase of LO_H and LO_V is equal. However, this may cause LO_H and LO_V to be distributed as high frequency signals over a relatively long distance. To save LO signal distribution power, it may be desirable to place the mixer 240a and the mixer 240b close to the corresponding transceiver modules 220, which would constrain the layout floor plan and may not be possible if a single LO generation block is used. Also, when the LO frequency is too high, it may not be possible to distribute it with guaranteed signal quality.

In embodiments, an edge triggered D flip-flop, may also be used to guarantee the LO signals to be in phase. However, it may not be possible to use the D flip-flop at certain frequency ranges. For example the D flip-flop may not be fast enable to be used at frequency ranges of tens of GHz.

Accordingly, some embodiments corresponding to FIGS. 2-8 may allow separate LO generation blocks, for example divider circuit 310a for the H-polarized path and divider circuit 310b for the V-polarized path, which may be turned off or deactivated when not used, while still guaranteeing that the H-polarized signals and V-polarized signals may be phase aligned when enabled for transmission. Embodiments may allow fast detection and alignment before each transmission.

Figure 5:
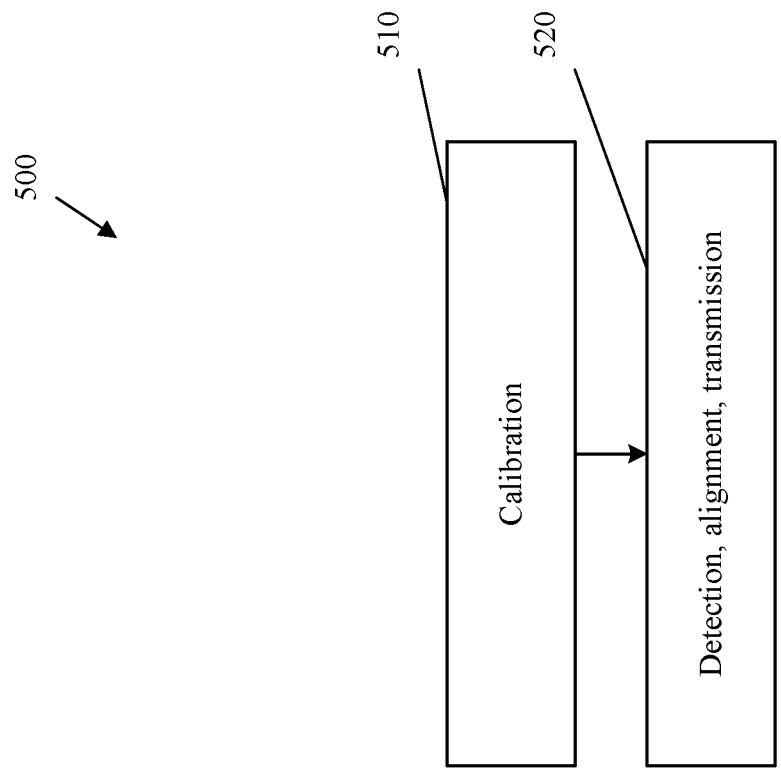
FIG. 5 is a flowchart of a process for controlling a communication device, according to embodiments.

FIG. 5 is a block diagram of an example of a process 500 of controlling a communication device, according to embodiments. In some implementations, one or more process blocks of FIG. 5 may be performed by communication system 100 or UE 104, or any other element described herein, for example front-end RFIC 140 or any one or more of transceiver modules 220a-220h.

As further shown in FIG. 5, at operation 510 the process 500 may include performing a calibration operation. In embodiments, the calibration operation may include determining in advance settings or parameters which may be used to detect a relative phase, and storing calibration information corresponding to the settings or parameters. In embodiments, the calibration operation of operation 510 may be performed at any time, for example at a time of manufacture of the UE 104, during a factory calibration, or during a power-up calibration performed during a power-up of UE 104 or any portion of UE 104, for example during a power-up operation of antenna module 130 or during a power-up operation of front-end RFIC 140.

As further shown in FIG. 5, at operation 520 the process 500 may include performing a detection, alignment, and transmission operation in which the relative H/V phase is determined based on the calibrated setting or parameter before proceeding with a transmission.

In operation 520, the UE 104 may detect whether the signal LO_H and LO_V are in phase or out-of-phase by 180 degrees when the two paths are enabled. By knowing the state of the relative phase H/V phase of the two LO signals, the phase in one of the signal paths may be adjusted using phase shifters, for example phase shifters 221, in the phased array transmitter to align the respective phases of the H-polarized and V-polarized streams.

As a result, process 500 may allow separate divide-by-two blocks, for example divider circuit 330a and divider circuit 330b, to be used in the generation of the LO_H signal and the LO_V signal. A 1TXH-1TXV-1RX loop back, which may refer to measuring transmissions from TXH0 to RXH1 and from TXV1 to RXH1, may be used to mimic the overall TXH and TXV operations of a full or complete dual-polarized transmission using all of the antennas of the phased array.

Figure 6:
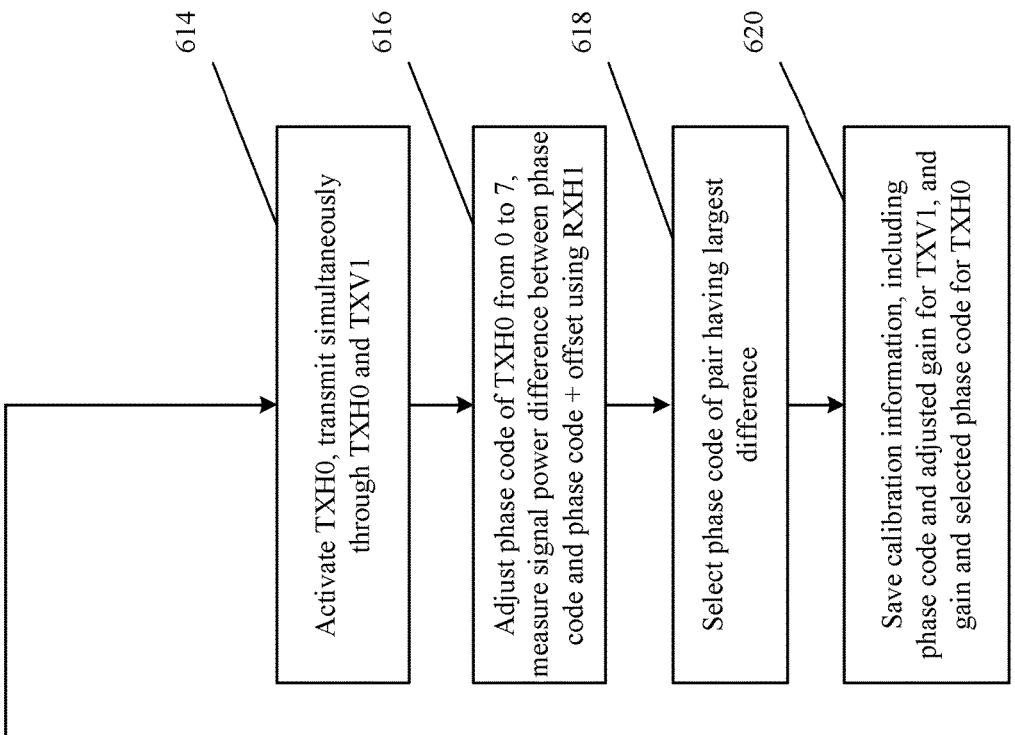
FIG. 6 is a flowchart of a process for controlling a communication device, according to embodiments.
Figure 6:
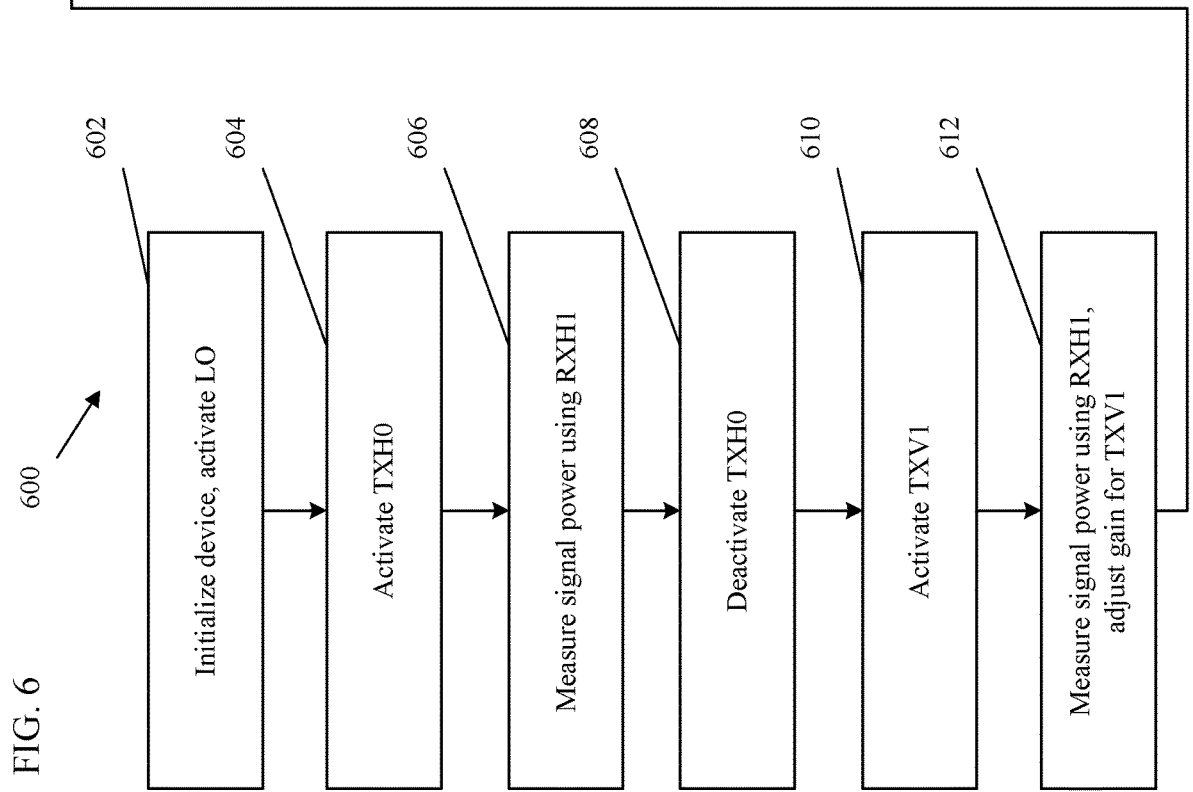

FIG. 6 is a block diagram of an example of a process 600 of controlling a communication device, according to embodiments. In some implementations, one or more process blocks of FIG. 6 may be performed by communication system 100 or UE 104, or any other element described herein, for example front-end RFIC 140 or any one or more of transceiver modules 220a-220h

In embodiments, process 600 may correspond to operation 510 discussed above.

As shown in FIG. 6, at operation 602 the process 600 may include initializing the communication device and activating an LO circuit. In embodiments, the LO circuit may correspond to LO circuit 210.

As further shown in FIG. 6, at operation 604 the process 600 may include activating TXH0. In embodiments, TXH0 may correspond to transceiver module 220a operating in a transmit mode. In embodiments TXH0 may be referred to as a first transceiver module.

As further shown in FIG. 6, at operation 606 the process 600 may include measuring a signal power corresponding to TXH0 using RXH1. In embodiments, RXH1 may correspond to transceiver module 220b operating in a receive mode. In embodiments RXH1 may be referred to as a second transceiver module. In embodiments operation 606 may include setting a gain for TXH0, transmitting a signal from TXH0 to RXH1, and measuring a signal power of the signal using PDET 226b.

As further shown in FIG. 6, at operation 608 the process 600 may include deactivating TXH0 while keeping a gain setting and a phase setting corresponding to TXH0 unchanged.

As further shown in FIG. 6, at operation 610 the process 600 may include activating TXV1. In embodiments, TXV1 may correspond to transceiver module 220h operating in a receive mode. In embodiments TXV1 may be referred to as a third transceiver module.

As further shown in FIG. 6, at operation 612 the process 600 may include measuring a signal power corresponding to TXV1 using RXH1, and adjusting a gain for TXV1. In embodiments operation 606 may include setting an initial gain for TXV1, transmitting a signal from TXV1 to RXH1, measuring a signal power of the signal using PDET 226b, and adjusting the gain until the measured signal power is within a predetermined range of the signal power measured for TXH0 in operation 606. In embodiments, the predetermined range may be, for example, within 6 dB, however embodiments are not limited thereto.

As further shown in FIG. 6, at operation 614 the process 600 may include activating TXH0, and transmitting using TXH0 and TXV1 simultaneously. In embodiments, the combined signal resulting from the simultaneous transmission may be referred to as a dual-polarized signal or a dual-polarized RF signal.

As further shown in FIG. 6, at operation 616 the process 600 may include, while transmitting simultaneously, adjusting a phase code of TXH0 from 0 to 7, and for each phase code from 0 to 7, measuring a difference in signal power between a dual-polarized RF signal corresponding to the phase code and an offset dual polarized RF signal corresponding to the offset phase code. In embodiments, the phase code may be referred to as a phase setting. For example, for each phase code X, in embodiments the dual-polarized RF signal may be generated by controlling TXH0 to generate an RF signal based on the phase code X, controlling TXV1 to generate an RF signal while TXH0 generates the RF signal based on the phase code X, and controlling RXH1 to measure the signal power of the combined signals. As another example, an offset dual-polarized RF signal may be generated by controlling TXH0 to generate an RF signal based on phase code X+offset, controlling TXV1 to generate an RF signal while TXH0 generates the RF signal based on the phase code X+offset, and controlling RXH1 to measure the signal power of the combined signals. In embodiments, X=0 to 7, and offset=180 degrees, although embodiments are not limited thereto. In embodiments, TXV1 may use the same settings, such as gain settings and phase settings, while generating the RF signal for the dual-polarized RF signal and while generating the offset dual-polarized RF signal.

Figure 7A:
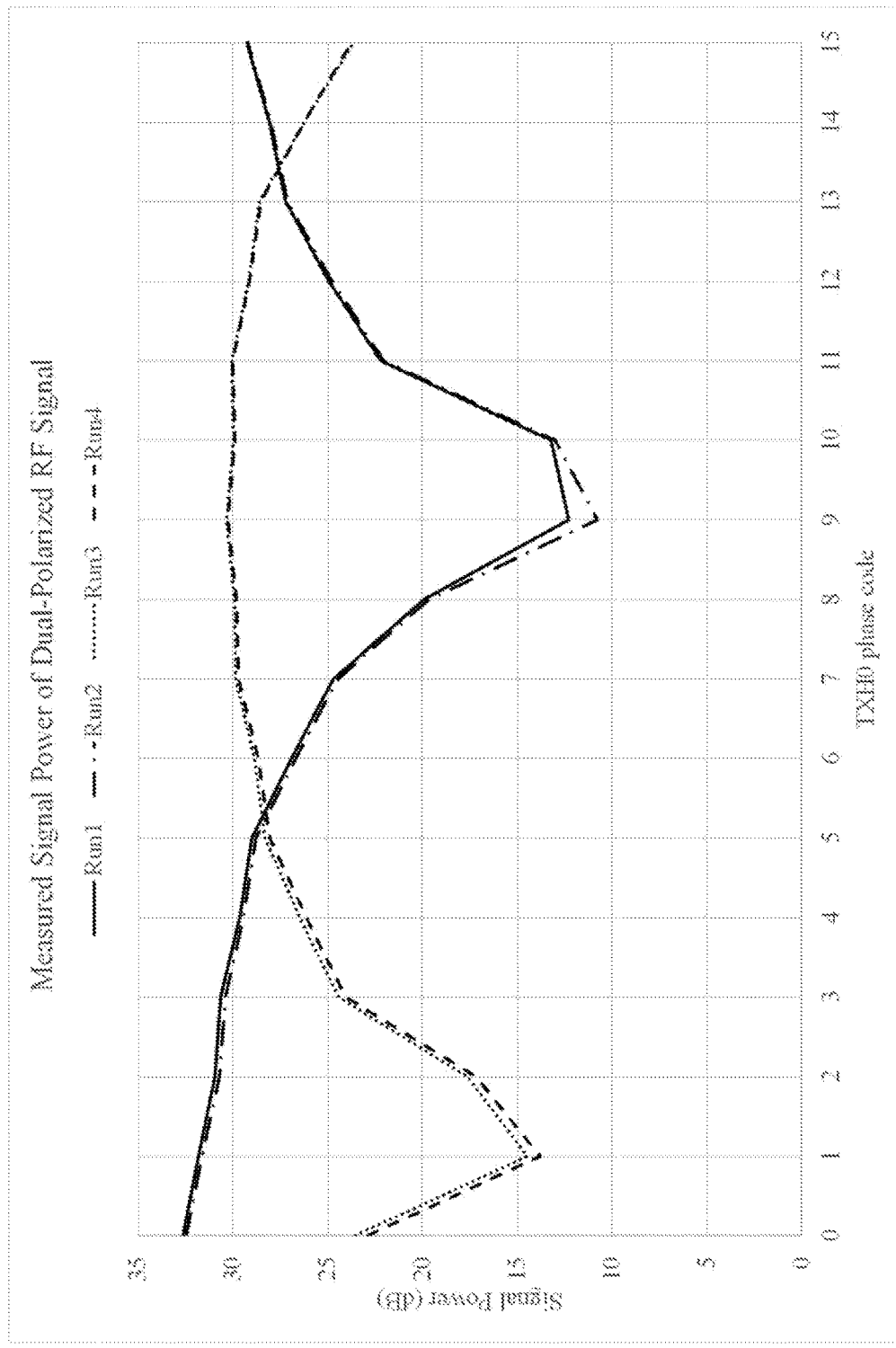
FIGS. 7A-7B are charts demonstrating examples of signal powers and signal power differences, according to embodiments.
Figure 7B:
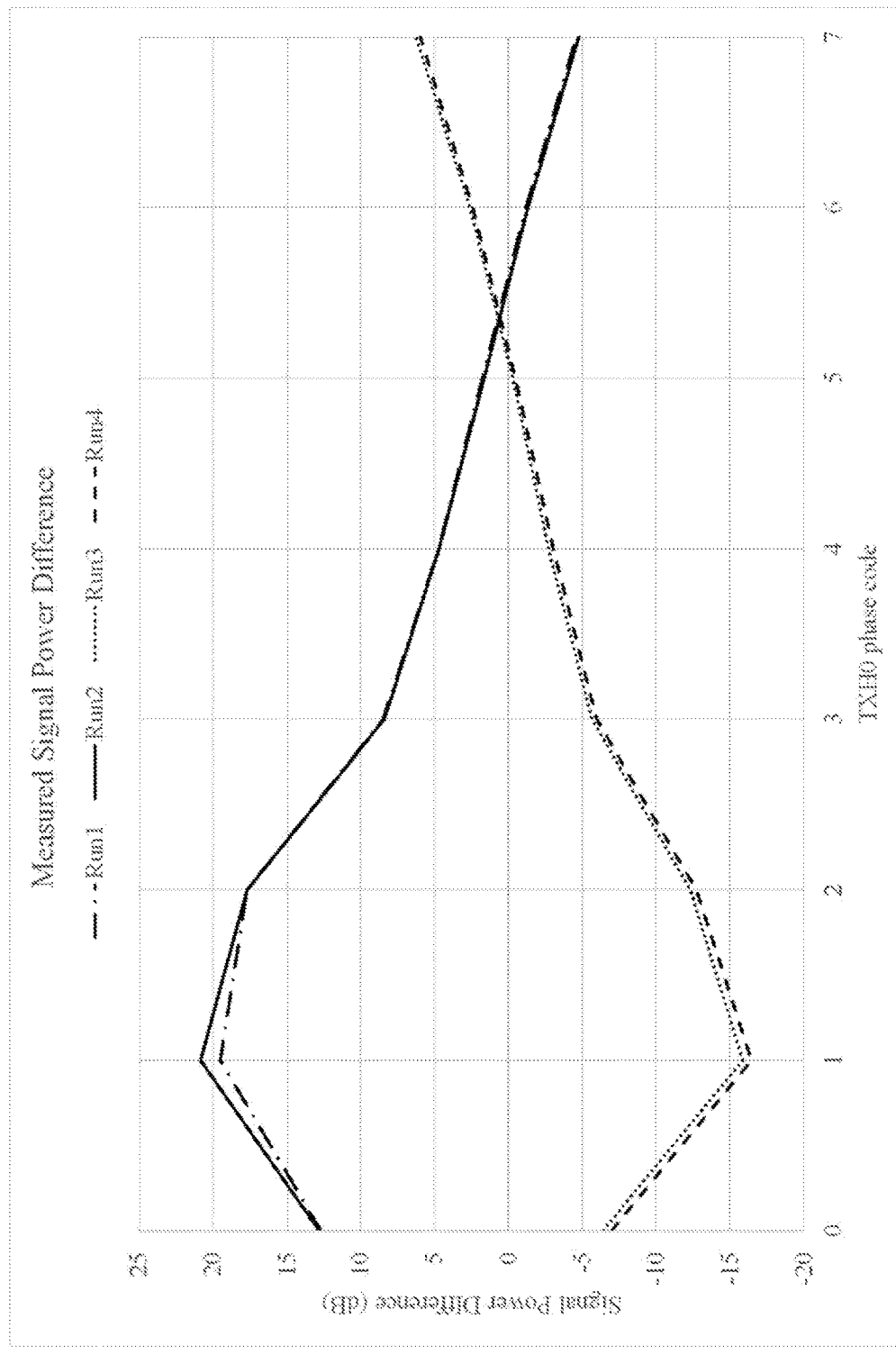

FIG. 7A shows examples of signal powers corresponding to various phase codes over four different measurement runs, run 1 through run 4, according to embodiments. For each phase code illustrated in FIG. 7A, the signal power of a corresponding dual-polarized RF signal may be determined by controlling TXH0 to generate an RF signal based on the phase code, controlling TXV1 to generate an RF signal while TXH0 generates the RF signal based on the phase code, and controlling RXH1 to measure the signal power of the combined signals. In embodiments, phase codes 0 to 7 of FIG. 7A may correspond to the phase codes X discussed above, and phase codes 8 to 15 of FIG. 7A may correspond to the phase codes X+offset discussed above. In embodiments, the signal powers may be measured at a PDET corresponding to an LNA, for example PDET 222b corresponding to LNA 224b, discussed above. FIG. 7B illustrates an example of various measured signal power differences between dual-polarized RF signals and offset dual-polarized RF signals, according to embodiments. In embodiments, the FIG. 7B may represent differences between the signal powers illustrated in FIG. 7A, and these difference may correspond to the differences measured in operation 616. Returning to FIG. 6, at operation 618 the process 600 may include selecting a phase pair having a largest difference in signal power. As can be seen in FIG. 7B, when phase code X=1, a difference between a signal power corresponding to phase code 1 and a signal power corresponding to phase code 1+8=9 may be a largest difference from among the signal power differences corresponding to phase codes 0-7. Accordingly, based on the example results shown in FIG. 7B, phase code 1 may be selected. However, embodiments are not limited thereto, and a different phase code may be selected for example based on different measurement results. In embodiments, a phase code that does not correspond to the largest difference may be selected. For example, in embodiments any phase code corresponding to a difference that is over a particular threshold may be selected. In embodiments, the selected phase code may be referred to as a calibration phase code, or a calibration phase setting.

Returning again to FIG. 6, at operation 620 the process 600 may include saving or storing calibration information based on the measurements above. For example, the calibration information may indicate or specify the gain of TXH0 used in the measurements above, the adjusted gain of TXV1 determined in operation 612, a phase code of TXV1 used in the measurements above, and the phase code of TXH0 determined or selected in operation 618.

Accordingly, in embodiments the calibration information may indicate settings or parameters for TXH0 and TXV1 which may allow a relative phase of the H/V transmissions, for example based on a relative phase of signal LO_H and LO_V, to be easily determined based on signals transmitted from TXH0 and TXV1 and measured by RXH1. For example, in embodiments the calibration information may indicate settings or parameters for TXH0 and TXV1 which may allow case 1 of FIG. 4 to be easily distinguished from case 2 of FIG. 4.

Figure 8:
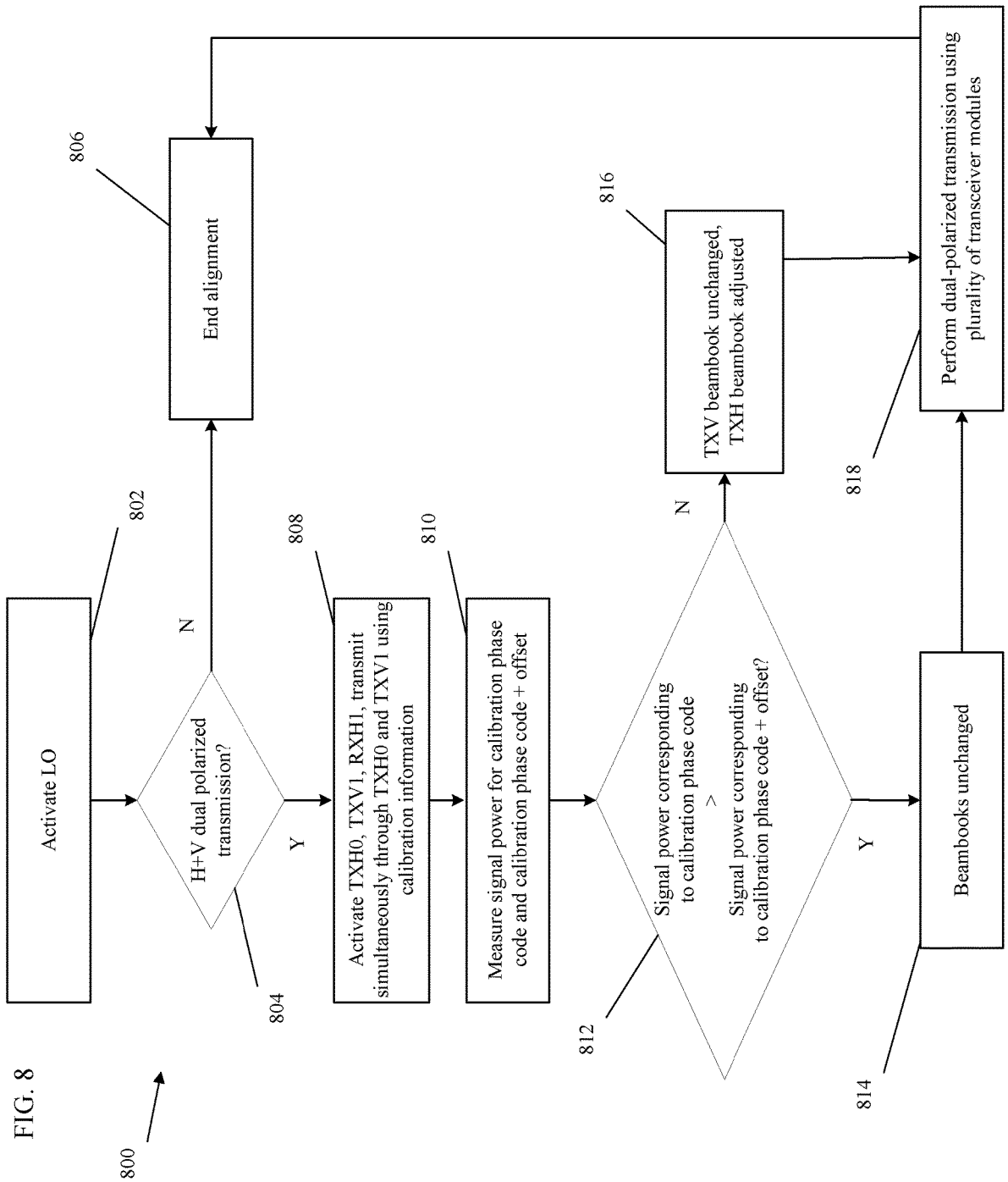
FIG. 8 is a flowchart of a process for controlling a communication device, according to embodiments.

FIG. 8 is a block diagram of an example of a process 800 of controlling a communication device, according to embodiments. In some implementations, one or more process blocks of FIG. 8 may be performed by communication system 100 or UE 104, or any other element described herein, for example front-end RFIC 140 or any one or more of transceiver modules 220a-220h.

In embodiments, process 800 may correspond to operation 520 discussed above.

As shown in FIG. 8, at operation 802 the process 800 may include activating the LO circuit. In embodiments, after the calibration information is determined and stored as described above, the LO circuit may be deactivated. Accordingly, in embodiments operation 802 may include reactivating the LO circuit.

As further shown in FIG. 8, at operation 804 the process 800 may include determining whether a dual-polarized transmission is to be performed. In embodiments, if it is determined that a dual transmission is not to be performed (NO at operation 804), process 800 may proceed to operation 806. In embodiments, if it is determined that a dual transmission is to be performed (YES at operation 804), process 800 may proceed to operation 808.

As further shown in FIG. 8, at operation 806 the process 800 may include ending the detection and alignment process. For example, in embodiments operation 802 may also be performed as part of a process for performing a single-polarized transmission, or a process for performing a receive operation. Therefore, there may be no need to perform an alignment corresponding to dual-polarized transmission.

As further shown in FIG. 8, at operation 808 the process 800 may include activating TXH0, TXV1, and RXH1, and transmitting simultaneously using the calibration information. For example, in embodiments, operation 808 may include generating a dual-polarized RF signal including a first RF signal generated by TXH0 based on the gain used in process 600 and the calibration phase code selected in operation 618, and a second RF signal generated by TXV1 based on the gain determined in operation 612 and the phase code used in process 600. In embodiments, operation 808 may further include generating an offset dual-polarized RF signal including an offset first RF signal generated by TXH0 based on the gain used in process 600 and the calibration phase code selected in operation 618 plus an offset, and the second RF signal generated by TXV1. In embodiments, adding the offset may correspond to shifting the phase 180 degrees. In embodiments, adding the offset may correspond to shifting the phase code by 8 phase codes.

As further shown in FIG. 8, at operation 810 the process 800 may include measuring, using RXH1, a signal power of the dual-polarized RF signal generated using the calibration phase code for TXH0, and a signal power of the offset dual-polarized RF signal generated using the calibration phase code plus the offset.

As further shown in FIG. 8, at operation 812 the process 800 may include determining whether the signal power of the dual-polarized RF signal is greater than the signal power of the offset dual-polarized RF signal. In embodiments, if it is determined that the signal power of the dual-polarized RF signal is not greater than the signal power of the offset dual-polarized RF signal (NO at operation 812), process 800 may proceed to operation 816. In embodiments, if it is determined that the signal power of the dual-polarized RF signal is greater than the signal power of the offset dual-polarized RF signal (YES at operation 812), process 800 may proceed to operation 814.

As further shown in FIG. 8, at operation 814 the process 800 may include leaving a beambook for TXH and TXV unchanged. In embodiments, a beambook may specify phase settings or phase codes for each transceiver module to be used in a full dual-polarized transmission. In embodiments, a determination of YES at operation 812 may indicate, for example, that the LO circuit is operating according to case 1 of FIG. 4. As a result, no modification to phases of the transceiver modules 220 may be desired.

As further shown in FIG. 8, at operation 816 the process 800 may include leaving the beambook for TXV unchanged, and modifying the beambook for TXH by adding an offset of 180 degrees. In embodiments, a determination of NO at operation 812 may indicate, for example, that the LO circuit is operating according to case 2 of FIG. 4. As a result, it may be desirable to modify a phase corresponding to LO_H by shifting the beambook corresponding to LO_H, which may be the beambook for TXH, or the beambook for H-polarized transmissions, by adding an offset of 180 degrees. However, embodiments are not limited thereto. For example, in embodiments, the beambook for TXH may be maintained and the beambook for TXV may be modified, or both beambooks may be modified, as desired.

As further shown in FIG. 8, at operation 818 the process 800 may include performing the dual-polarized transmission using the plurality of transceiver modules 220. In embodiments, the dual-polarized transmission may be performed using some or all of the plurality of transceiver modules 220, as desired.

As further shown in FIG. 8, at operation 806 the process 800 may include ending the alignment process.

Although TXH0, RXH1, and TXV1 are mentioned above in the description of FIGS. 5-6 and 8, embodiments are not limited thereto. In embodiments, any of the transceiver modules described above may be used to perform the steps of processes 500, 600, and 800 as desired. In embodiments, a first RF signal may be generated based on LO_H, transmitted using a first antenna, and measured using a second antenna, and a second RF signal may be generated based on LO_V, transmitted using a third antenna, and measured using the second antenna.

Although FIGS. 5-6 and 8 show example blocks of the processes 500, 600, and 800, in some implementations, the processes 500, 600, and 800 may include additional blocks, fewer blocks, different blocks, or differently arranged blocks than those depicted in FIGS. 5-6 and 8. Additionally, or alternatively, two or more of the blocks of the processes 500, 600, and 800 may be arranged or combined in any order, or performed in parallel. For example, in embodiments one or more of the operations 602-620 of process 600 may be included in operation 510 of process 500. As another example, one or more of the operations 802-818 of process 800 may be included in operation 520 of process 500.

Accordingly, embodiments described above may allow separate LO generation blocks with divide-by-two dividers for a dual-polarized phase array system while maintaining their relative phase relationship.

Embodiments may detect the relative phase state of the two signal streams in a dual-polarized phased array system. In embodiments, the 180 degree phase difference caused by the divide-by-two operation may be compensated by adjusting a phase delay of a phase shifter in the signal path.

Embodiments may relate to a calibration procedure to find a setting or parameter that may be used for the two state detection. Embodiments further relate to a detection procedure to align the phase of the two dual-polarized transmitting signals.

In embodiments, 1TXH-1TXV-1RX loopback may be used to mimic the TXH and TXV dual-polarized operation. In embodiments, the combined TXH and TXV power may be measured using a third antenna element in RX mode with a power detector.

As is traditional in the field, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

The various operations of methods described above may be performed by any suitable means capable of performing the operations, such as various hardware and/or software component(s), circuits, and/or module(s).

The software may include an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The foregoing is illustrative of the embodiments and is not to be construed as limiting thereof. Although a few embodiments have been described, those skilled in the art will readily appreciate that many modifications are possible in the embodiments without materially departing from the present scope.

What is claimed is:

1. A communication device, comprising:
   a plurality of transceiver modules including a first transceiver module and a second transceiver module; and
   at least one processor configured to:
      generate a first dual-polarized radio frequency (RF) signal by controlling the first transceiver module to generate a first RF signal based on calibration information stored in the communication device;
      measure, by the second transceiver module, a first signal power of the first dual-polarized RF signal;
      adjust a parameter of the first transceiver module, and generate a second dual-polarized RF signal by controlling the first transceiver module to generate a second RF signal based on the adjusted parameter;
      measure, by the second transceiver module, a second signal power of the second dual-polarized RF signal; and
      generate an aligned dual-polarized RF signal by controlling the plurality of transceiver modules to generate a plurality of RF signals based on a result of a comparison between the first signal power and the second signal power.

2. The communication device of claim 1, wherein the plurality of transceiver modules includes a third transceiver module,
   wherein the at least one processor is further configured to generate the first dual-polarized RF signal by controlling the third transceiver module to generate a third RF signal based on the calibration information, and
   wherein the at least one processor is further configured to generate the second dual-polarized RF signal by controlling the third transceiver module to generate the third RF signal.

3. The communication device of claim 2, wherein the first RF signal and the second RF signal are polarized in a first direction, and
   wherein the third RF signal is polarized in a second direction different from the first direction.

4. The communication device of claim 2, wherein the first RF signal and the second RF signal are transmitted using a first antenna included in an antenna array, wherein the first dual-polarized RF signal and the second dual-polarized RF signal are received using a second antenna included in the antenna array, and wherein the third RF signal is transmitted using a third antenna included in the antenna array.

5. The communication device of claim 2, further comprising a local oscillator circuit, wherein the first RF signal is generated based on a first local oscillator signal generated by the local oscillator circuit, and wherein the third RF signal is generated based on a second local oscillator signal generated by the local oscillator circuit.

6. The communication device of claim 2, wherein the parameter is a first parameter which specifies a first phase setting of a first phase shifter included in the first transceiver module, wherein the third RF signal is generated using the third transceiver module based on a second parameter included in the calibration information, wherein the second parameter specifies a second phase setting of a second phase shifter included in the third transceiver module, and wherein the adjusting the first parameter comprises adding a 180 degree offset to the first phase setting.

7. The communication device of claim 2, wherein the at least one processor is further configured to:

measure, using the second transceiver module, a plurality of differences between a plurality of pairs of dual-polarized RF signals, wherein each pair of the plurality of pairs of dual-polarized RF signals includes a dual-polarized RF signal generated using the first transceiver module and the third transceiver module, and an offset dual-polarized RF signal generated using the first transceiver module and the third transceiver module;

determine a calibration first phase setting corresponding to the first transceiver module based on the plurality of differences; and determine the calibration information based on the calibration first phase setting.

8. The communication device of claim 1, wherein based on the result of the comparison indicating that the first signal power is greater than the second signal power, the at least one processor is further configured to generate the aligned dual-polarized RF signal based on a beambook corresponding to the first transceiver module, and wherein based on the result of the comparison indicating that the first signal power is lower than the second signal power, the at least one processor is further configured to adjust the beambook by adding a 180 degree offset, and generate the aligned dual-polarized RF signal based on the adjusted beambook.

9. A communication device, comprising:

a plurality of transceiver modules including a first transceiver module, a second transceiver module, and a third transceiver module; and at least one processor configured to:

measure, using the second transceiver module, a plurality of differences between a plurality of pairs of dual-polarized radio frequency (RF) signals, wherein each pair of the plurality of pairs of dual-polarized RF signals includes a dual-polarized RF signal generated using the first transceiver module and the third transceiver module, and an offset dual-polarized RF signal generated using the first transceiver module and the third transceiver module;

determine a calibration first phase setting corresponding to the first transceiver module based on the plurality of differences; and determine calibration information based on the calibration first phase setting.

10. The communication device of claim 9, wherein the at least one processor is further configured to:

control the first transceiver module to generate a first RF signal based on a first gain, and measure, by the second transceiver module, a first signal power corresponding to the first RF signal;

control the third transceiver module to generate a second RF signal based on a second gain, and measure, by the second transceiver module, a second signal power corresponding to the second RF signal; and based on the second signal power being within a predetermined range of the first signal power, determine the calibration information based on the first gain and the second gain, and wherein the plurality of pairs of dual-polarized RF signals are generated using the first gain and the second gain.

11. The communication device of claim 9, wherein to determine the calibration first phase setting, the at least one processor is further configured to:

measure, using the second transceiver module, a first signal power of a first dual-polarized RF signal including a first RF signal generated using the first transceiver module based on a first phase setting;

obtain an offset first phase setting by adding a 180 degree offset to the first phase setting, and measure, using the second transceiver module, a second signal power of an offset first dual-polarized RF signal including an offset first RF signal generated using the first transceiver module based on the offset first phase setting;

measure, using the second transceiver module, a third signal power of a second dual-polarized RF signal including a second RF signal generated using the first transceiver module based on a second phase setting;

obtain an offset second phase setting by adding a 180 degree offset to the second phase setting, and measure, using the second transceiver module, a fourth signal power of an offset second dual-polarized RF signal including an offset second RF signal generated using the first transceiver module based on the offset second phase setting; and based on a difference between the first signal power and the second signal power being larger than a difference between the third signal power and the fourth signal power, determine the first phase setting as the calibration first phase setting.

12. The communication device of claim 9, further comprising a local oscillator circuit, wherein the first transceiver module is configured to operate based on a first local oscillator signal generated by the local oscillator circuit, and wherein the third transceiver module is configured to operate based on a second local oscillator signal generated by the local oscillator circuit.

13. The communication device of claim 12, wherein after the calibration information is determined, the local oscillator circuit is deactivated, and wherein the at least one processor is further configured to:

reactivate the local oscillator circuit;

align the plurality of transceiver modules based on the calibration information; and generate an aligned dual-polarized RF signal by controlling the plurality of transceiver modules to generate a plurality of RF signals based on a result of the aligning.

14. The communication device of claim 13, wherein to align the plurality of transceiver modules, the at least one processor is further configured to:
generate a first dual-polarized RF signal by controlling the first transceiver module to generate a first RF signal based on the calibration first phase setting;
measure, by the second transceiver module, a first signal power of the first dual-polarized RF signal;
obtain an offset first phase setting by adding a 180 degree offset to the calibration first phase setting, and generate a second dual-polarized RF signal by controlling the first transceiver module to generate a second RF signal based on the offset first phase setting;
measure, by the second transceiver module, a second signal power of the second dual-polarized RF signal; and
generate the aligned dual-polarized RF signal by controlling the plurality of transceiver modules to generate a plurality of aligned RF signals based on a result of a comparison between the first signal power and the second signal power.

15. The communication device of claim 14, wherein based on the result of the comparison indicating that the first signal power is greater than the second signal power, the at least one processor is further configured to generate the aligned dual-polarized RF signal based on a beambook corresponding to the first transceiver module, and
wherein based on the result of the comparison indicating that the first signal power is lower than the second signal power, the at least one processor is further configured to adjust the beambook by adding a 180 degree offset, and generate the aligned dual-polarized RF signal based on the adjusted beambook.

16. A method of controlling a communication device, the method being executed by at least one processor and comprising:
obtaining calibration information;
generating a first dual-polarized radio frequency (RF) signal by controlling a first transceiver module of a plurality of transceiver modules to generate a first RF signal based on the calibration information;
measuring, by a second transceiver module of the plurality of transceiver modules, a first signal power of the first dual-polarized RF signal;
adjusting a parameter of the first transceiver module, and generating a second dual-polarized RF signal by controlling the first transceiver module to generate a second RF signal based on the adjusted parameter;
measuring, by the second transceiver module, a second signal power of the second dual-polarized RF signal; and
generating an aligned dual-polarized RF signal by controlling the plurality of transceiver modules to generate a plurality of RF signals based on a result of a comparison between the first signal power and the second signal power.

17. The method of claim 16, wherein the plurality of transceiver modules includes a third transceiver module,
wherein the generating of the first dual-polarized RF signal comprises controlling the third transceiver module to generate a third RF signal based on the calibration information, and
wherein the generating of the second dual-polarized RF signal comprises controlling the third transceiver module to generate the third RF signal.

18. The method of claim 17, wherein the first RF signal and the second RF signal are polarized in a first direction, and
wherein the third RF signal is polarized in a second direction different from the first direction.

19. The method of claim 17, wherein the first RF signal and the second RF signal are transmitted using a first antenna included in an antenna array,
wherein the first dual-polarized RF signal and the second dual-polarized RF signal are received using a second antenna included in the antenna array, and
wherein the third RF signal is transmitted using a third antenna included in the antenna array.

20. The method of claim 17, further comprising a local oscillator circuit,
wherein the first RF signal is generated based on a first local oscillator signal generated by the local oscillator circuit, and
wherein the third RF signal is generated based on a second local oscillator signal generated by the local oscillator circuit.

21. The method of claim 17, wherein the parameter is a first parameter which specifies a first phase setting of a first phase shifter included in the first transceiver module,
wherein the third RF signal is generated using the third transceiver module based on a second parameter included in the calibration information, wherein the second parameter specifies a second phase setting of a second phase shifter included in the third transceiver module, and
wherein the adjusting the first parameter comprises adding a 180 degree offset to the first phase setting.

22. The method of claim 17, further comprising:
measuring, using the second transceiver module, a plurality of differences between a plurality of pairs of dual-polarized RF signals, wherein each pair of the plurality of pairs of dual-polarized RF signals includes a dual-polarized RF signal generated using the first transceiver module and the third transceiver module, and an offset dual-polarized RF signal generated using the first transceiver module and the third transceiver module;
determining a calibration first phase setting corresponding to the first transceiver module based on the plurality of differences; and
determining the calibration information based on the calibration first phase setting.

23. The method of claim 16, wherein based on the result of the comparison indicating that the first signal power is greater than the second signal power, the method further comprises generating the aligned dual-polarized RF signal based on a beambook corresponding to the first transceiver module, and
wherein based on the result of the comparison indicating that the first signal power is lower than the second signal power, the method further comprising adjusting the beambook by adding a 180 degree offset, and generating the aligned dual-polarized RF signal based on the adjusted beambook.

24. A method of controlling a communication device, the method being executed by at least one processor and comprising:
obtaining calibration information;

measuring, using a second transceiver module of a plurality of transceiver modules, a plurality of differences between a plurality of pairs of dual-polarized radio frequency (RF) signals, wherein each pair of the plurality of pairs of dual-polarized RF signals includes a dual-polarized RF signal generated using a first transceiver module and a third transceiver module of the plurality of transceiver modules, and an offset dual-polarized RF signal generated using the first transceiver module and the third transceiver module;

determining a calibration first phase setting corresponding to the first transceiver module based on the plurality of differences; and determining the calibration information based on the calibration first phase setting.

25. The method of claim 24, further comprising:

controlling the first transceiver module to generate a first RF signal based on a first gain, and measuring, by the second transceiver module, a first signal power corresponding to the first RF signal;

controlling the third transceiver module to generate a second RF signal based on a second gain, and measuring, by the second transceiver module, a second signal power corresponding to the second RF signal; and based on the second signal power being within a predetermined range of the first signal power, determining the calibration information based on the first gain and the second gain, wherein the plurality of pairs of dual-polarized RF signals are generated using the first gain and the second gain.

26. The method of claim 24, wherein the determining of the calibration first phase setting comprises:

measuring, using the second transceiver module, a first signal power of a first dual-polarized RF signal including a first RF signal generated using the first transceiver module based on a first phase setting;

obtaining an offset first phase setting by adding a 180 degree offset to the first phase setting, and measuring, using the second transceiver module, a second signal power of an offset first dual-polarized RF signal including an offset first RF signal generated using the first transceiver module based on the offset first phase setting;

measuring, using the second transceiver module, a third signal power of a second dual-polarized RF signal including a second RF signal generated using the first transceiver module based on a second phase setting;

obtaining an offset second phase setting by adding a 180 degree offset to the second phase setting, and measuring, using the second transceiver module, a fourth signal power of an offset second dual-polarized RF signal including an offset second RF signal generated using the first transceiver module based on the offset second phase setting; and based on a difference between the first signal power and the second signal power being larger than a difference between the third signal power and the fourth signal power, determining the first phase setting as the calibration first phase setting.

27. The method of claim 24, wherein the first transceiver module is configured to operate based on a first local oscillator signal generated by a local oscillator circuit included in the communication device, and wherein the third transceiver module is configured to operate based on a second local oscillator signal generated by the local oscillator circuit.

28. The method of claim 27, wherein after the calibration information is determined, the local oscillator circuit is deactivated, and wherein the method further comprises:

reactivating the local oscillator circuit;

aligning the plurality of transceiver modules based on the calibration information; and generating an aligned dual-polarized RF signal by controlling the plurality of transceiver modules to generate a plurality of RF signals based on a result of the aligning.

29. The method of claim 28, wherein the aligning the plurality of transceiver modules comprises:

generating a first dual-polarized RF signal by controlling the first transceiver module to generate a first RF signal based on the calibration first phase setting;

measuring, by the second transceiver module, a first signal power of the first dual-polarized RF signal;

obtaining an offset first phase setting by adding a 180 degree offset to the calibration first phase setting, and generating a second dual-polarized RF signal by controlling the first transceiver module to generate a second RF signal based on the offset first phase setting;

measuring, by the second transceiver module, a second signal power of the second dual-polarized RF signal; and generating the aligned dual-polarized RF signal by controlling the plurality of transceiver modules to generate a plurality of aligned RF signals based on a result of a comparison between the first signal power and the second signal power.

30. The method of claim 29, wherein based on the result of the comparison indicating that the first signal power is greater than the second signal power, the method further comprises generating the aligned dual-polarized RF signal based on a beambook corresponding to the first transceiver module, and wherein based on the result of the comparison indicating that the first signal power is lower than the second signal power, the method further comprises adjusting the beambook by adding a 180 degree offset, and generating the aligned dual-polarized RF signal based on the adjusted beambook.

* * * * *